United States Patent
Sato et al.

[11] Patent Number: 6,136,070
[45] Date of Patent: Oct. 24, 2000

[54] GAS REFINING METHOD USING A PRESSURE SWING ADSORPTION METHOD

[75] Inventors: Hiroyuki Sato, Kobe; Mamoru Shiraishi, Nishinomiya; Eiji Minagawa, Osaka, all of Japan

[73] Assignees: Kabushiki Kaisha Kobe Seiko Sho, Kobe; The Kansai Coke and Chemicals Co., Ltd., Amagasaki, both of Japan

[21] Appl. No.: 09/189,403

[22] Filed: Nov. 10, 1998

[30] Foreign Application Priority Data

Nov. 11, 1997 [JP] Japan ................................ 9-308999

[51] Int. Cl.⁷ ................................................ B01D 53/053
[52] U.S. Cl. ................................ 95/98; 95/105; 95/140
[58] Field of Search ........................ 95/96–98, 100–103, 95/105, 140

[56] References Cited

U.S. PATENT DOCUMENTS

| | | | |
|---|---|---|---|
| 4,539,020 | 9/1985 | Sakuraya et al. | 95/140 X |
| 4,705,541 | 11/1987 | Sircar | 95/140 X |
| 4,726,816 | 2/1988 | Fuderer | 95/140 X |
| 4,775,394 | 10/1988 | Yamano et al. | 95/101 |
| 4,840,647 | 6/1989 | Hay | 95/100 |
| 4,861,351 | 8/1989 | Nicholas et al. | 95/140 X |
| 5,013,334 | 5/1991 | Maurer | 95/100 |
| 5,015,272 | 5/1991 | Okada et al. | 95/100 X |
| 5,051,115 | 9/1991 | Leitgeb et al. | 95/140 X |
| 5,232,473 | 8/1993 | Kapoor et al. | 95/101 |
| 5,248,322 | 9/1993 | Kumar | 95/101 |
| 5,258,059 | 11/1993 | Yamaguchi et al. | 95/100 |
| 5,258,571 | 11/1993 | Golden et al. | 95/140 X |
| 5,354,346 | 10/1994 | Kumar | 95/140 X |
| 5,531,809 | 7/1996 | Golden et al. | 95/140 X |

FOREIGN PATENT DOCUMENTS 7-136444  5/1995  Japan .

*Primary Examiner*—Robert H. Spitzer
*Attorney, Agent, or Firm*—Oblon, Spivak, McClelland, Maier & Neustadt, P.C.

[57] ABSTRACT

In a gas refining method using a PSA method, a cleaning step is divided into a preparatory cleaning step and a substantial cleaning step, and an exhaust gas (particularly a high concentration gas obtained in the latter half is effective) obtained in the substantial cleaning step is used as a gas to be admitted into an adsorption column in the preparatory cleaning step. This method is employed, for example, to refine carbon monoxide from a material gas containing carbon monoxide. Accordingly, the gas refining method using the PSA method can ensure a specified amount of collected gas product without resulting in an increase in the amount of adsorbent even if a low concentration material gas is used.

3 Claims, 4 Drawing Sheets

GAS REFINING METHOD USING A PRESSURE SWING ADSORPTION METHOD

BACKGROUND OF THE INVENTION

This invention relates to a gas refining method using a pressure swing adsorption (PSA) method and particularly to a PSA method for refining high purity carbon monoxide from a mixed gas containing a low concentration of carbon monoxide.

The PSA method is such that a specific component gas contained in a material gas is adsorbed by adsorbent by increasing a pressure, and the pressure is then reduced to separate the specific component gas from the material gas by desorbing the specific component from the adsorbent. The above process is described in detail with respect to an exemplary case where the specific component gas is a carbon monoxide gas. The above process is comprised of ① a pressure increasing step of increasing a pressure inside an adsorption column charged with adsorbent to a specified adsorption pressure, ② an adsorbing step of adsorbing carbon monoxide by the adsorbent by admitting a material gas containing carbon monoxide into the adsorption column, ③ a pressure decreasing step of decreasing the pressure inside the adsorption column to or near an atmospheric pressure after the adsorbing step, ④ a cleaning step of discharging an exhaust gas from the adsorption column by supplying a part of the high purity carbon monoxide gas collected as a gas product to the adsorption column, and ⑤ a product collecting step of desorbing the carbon monoxide adsorbed by the adsorbent by decreasing the pressure inside the adsorption column below the atmospheric pressure and collecting the desorbed carbon monoxide as a gas product. By repeating the above steps, carbon monoxide can be refined from the material gas containing carbon monoxide. For the separation of the carbon monoxide gas, an adsorbent in which cuprous chloride is supported on a carrier such as activated alumina, activated carbon, and synthetic zeolite is used.

In actually performing operations using the PSA method, it is a general practice to install a plurality of adsorption columns one after another to continuously collect a gas product so as to increase a production efficiency. For example, in the case that four adsorption columns A to D are installed as shown in FIG. 1, operations run in accordance with an operation flow chart of FIG. 2.

Material gases used to refine a carbon monoxide gas therefrom according to the PSA method include converted gases of by-product gases produced at iron works, methanol cracked gases, and gases reformed from naphtha, LNG, LPG, or the like. The carbon monoxide gas products collected from these material gases are expected to have a purity of 99% or higher. The production of such high purity carbon monoxide gas is relatively easy in the case that the high purity converted gas having a carbon monoxide concentration of 70% or higher is used. It is, however, difficult to collect a high purity gas product from a methanol cracked gas having a carbon monoxide concentration of about 30%. In view of this difficulty, for example, Japanese Unexamined Patent Publication No. 7-136444 discloses a PSA method for collecting a high purity gas product by admitting a gas used to increase a pressure into the adsorption column in a direction opposite from a direction in which the material gas is admitted during the pressure increasing step.

Recently, there has been a demand to collect a high purity carbon oxide gas product from a reformed gas of very low carbon monoxide concentration of about 10%. It is possible to collect the high purity carbon monoxide gas product according to the PSA method using a reformed gas as a material gas. However, this necessitates a considerable increase in the amount of the gas product admitted into the adsorption column during the cleaning step, resulting in a reduction in the amount of the collected gas product. An attempt to ensure a specified amount of gas product necessitates a considerable increase in the amount of adsorbent. Accordingly, there is a demand for a method for increasing an amount of collected gas product by improving the PSA method.

SUMMARY OF THE INVENTION

In view of the above problems residing in the prior art, an object of the present invention is to provide a gas refining method which can ensure a specified amount of collected gas product without resulting in an increase in the amount of adsorbent even if a material gas having a low concentration of a specific component to be refined is used with the PSA method.

Accordingly, the invention is directed to a gas refining method using a pressure swing adsorption method, characterized by dividing a cleaning step into a preparatory cleaning step and a substantial cleaning step and using an exhaust gas (particularly a high concentration gas obtained in the latter half is effective) obtained in the substantial cleaning step as a gas to be admitted into an adsorption column in the preparatory cleaning step. For example, this method is employed to refine carbon monoxide from a material gas containing carbon monoxide. Hereinafter, the invention is described with respect to typical examples where a specific component refined from the material gas is carbon monoxide.

These and other objects, features and advantages of the present invention will become more apparent upon a reading of the following detailed description and accompanying drawings.

DETAILED DESCRIPTION OF PREFERRED EMBODIMENTS OF THE INVENTION

The inside of an adsorption column is divided into an adsorbent charged section where a carbon monoxide adsorbent is charged and adsorbent non-charged sections where the carbon monoxide adsorbent is not charged. The adsorbent non-charged sections, i.e. dead spaces, are so designed as to have a minimum possible capacity, but those having a certain capacity need to be located at least at the upper and bottom ends of the adsorption column. Further, a space is defined also in the adsorbent charged section.

Figure 3:
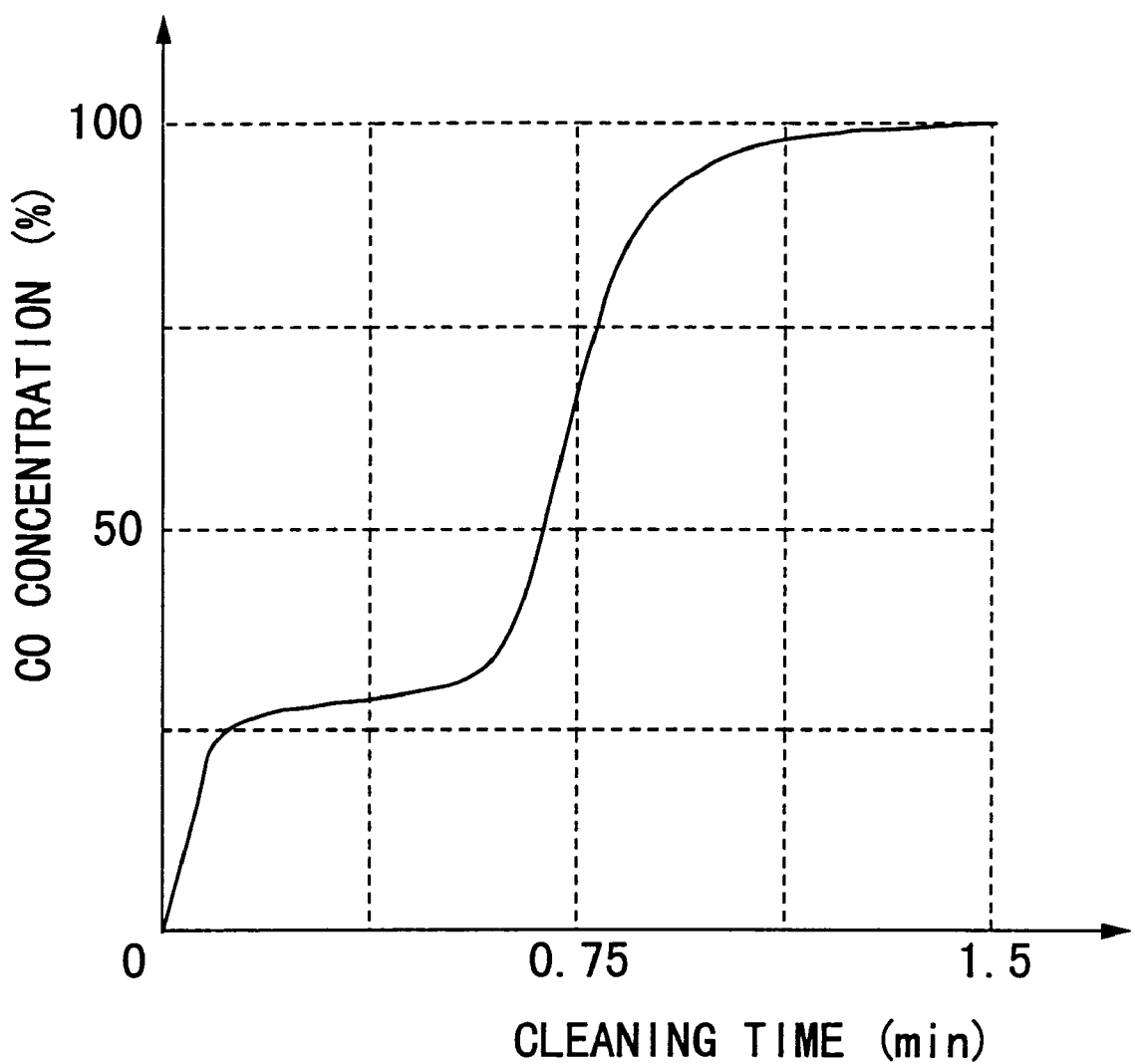
FIG. 3 is a graph showing the carbon monoxide concentration of an exhaust gas in relation to a cleaning time during a conventional cleaning step.

In a cleaning step, a part of a high purity carbon monoxide gas collected as a gas product is returned to the adsorbent column, thereby discharging the material gas present in the adsorbent non-charged section and the one present in the space in the adsorbent charged section. FIG. 3 is a graph showing the carbon monoxide concentration of the gas discharged from the adsorption column during the cleaning step. In the former half of the cleaning step, since a remaining exhaust gas of the material gas from which carbon monoxide has been separated is mainly discharged, the carbon monoxide concentration is low. It then increases gradually. When the material gas is discharged, the carbon monoxide concentration suddenly increases, with the result that the carbon monoxide concentration of the exhaust gas increases during the cleaning step.

The inventors of the present invention restudied whether or not the conventional PSA method can be improved. As a result, they found out that a high purity carbon monoxide gas of 99% or higher similar to the gas product needed not be used in the former half of the cleaning step and a sufficient cleaning effect could be attained if a carbon monoxide gas having a relatively high purity as compared with the material gas was used, and hit upon the present invention. Specifically, the cleaning step is divided into a preparatory cleaning step and a substantial cleaning step. An amount of the gas product used in the cleaning step is considerably reduced by admitting the exhaust gas discharged from the adsorption column in the substantial cleaning step into the adsorption column in the preparatory cleaning step.

The cleaning step may be divided into the preparatory and substantial cleaning steps by halving the cleaning time. Alternatively, the preparatory cleaning step may be so set to last until the carbon monoxide concentration becomes 50 to 80% in the graph of FIG. 3, and the substantial cleaning step may follow thereafter.

The cleaning step is performed under a normal atmospheric pressure or under a slight negative pressure. In this invention, it is desirable to perform the preparatory cleaning step under a negative pressure of up to $-0.3$ kg/cm$^2$G to promote the desorption of impurities. Further, it is desirable to perform the substantial cleaning step under a negative pressure of up to $-0.1$ kg/cm$^2$G.

Figure 4:
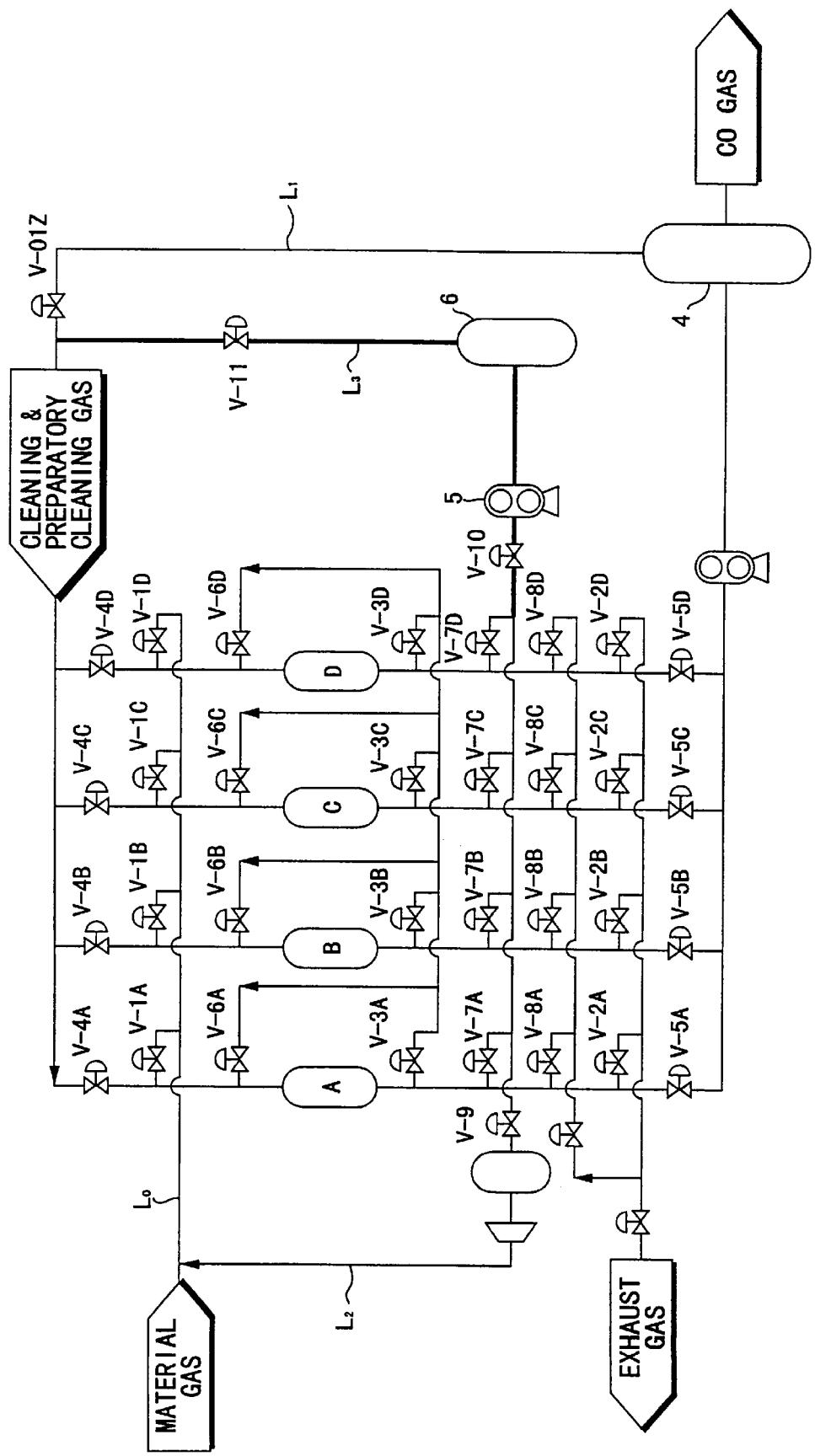
FIG. 4 is a schematic diagram showing a production line employed for a PSA method according to the invention.

FIG. 4 shows a typical production line employed for the PSA method according to the present invention. A conventional recycle line $L_1$ is adapted to return a high purity exhaust gas discharged from the adsorption column during the cleaning step to a material supply line $L_0$ as a material gas. In the PSA production line of FIG. 4, a valve V-9 is provided in the recycle line $L_1$; a gas line $L_3$ for the preparatory cleaning which is branched from the recycle line $L_1$ is connected with a cleaned gas (gas product) supply line $L_2$; and valves V-10, V-11, a blower 5 and a gas tank 6 for the preparatory cleaning are additionally provided. Accordingly, the exhaust gas discharged after the adsorption column is cleaned by the high purity carbon monoxide gas returned from a surge tank 4 in the cleaning step of the invention can be used for the next preparatory cleaning step after being stored in the gas tank 6 by the blower 5.

Hereafter, the invention is described in more detail with respect to the example. It should be appreciated that the invention is not limited to the following examples and design changes within the scope and spirit of the present invention described above and below are also embraced by the technical scope of the present invention.

EXAMPLE 1

Figure 1:
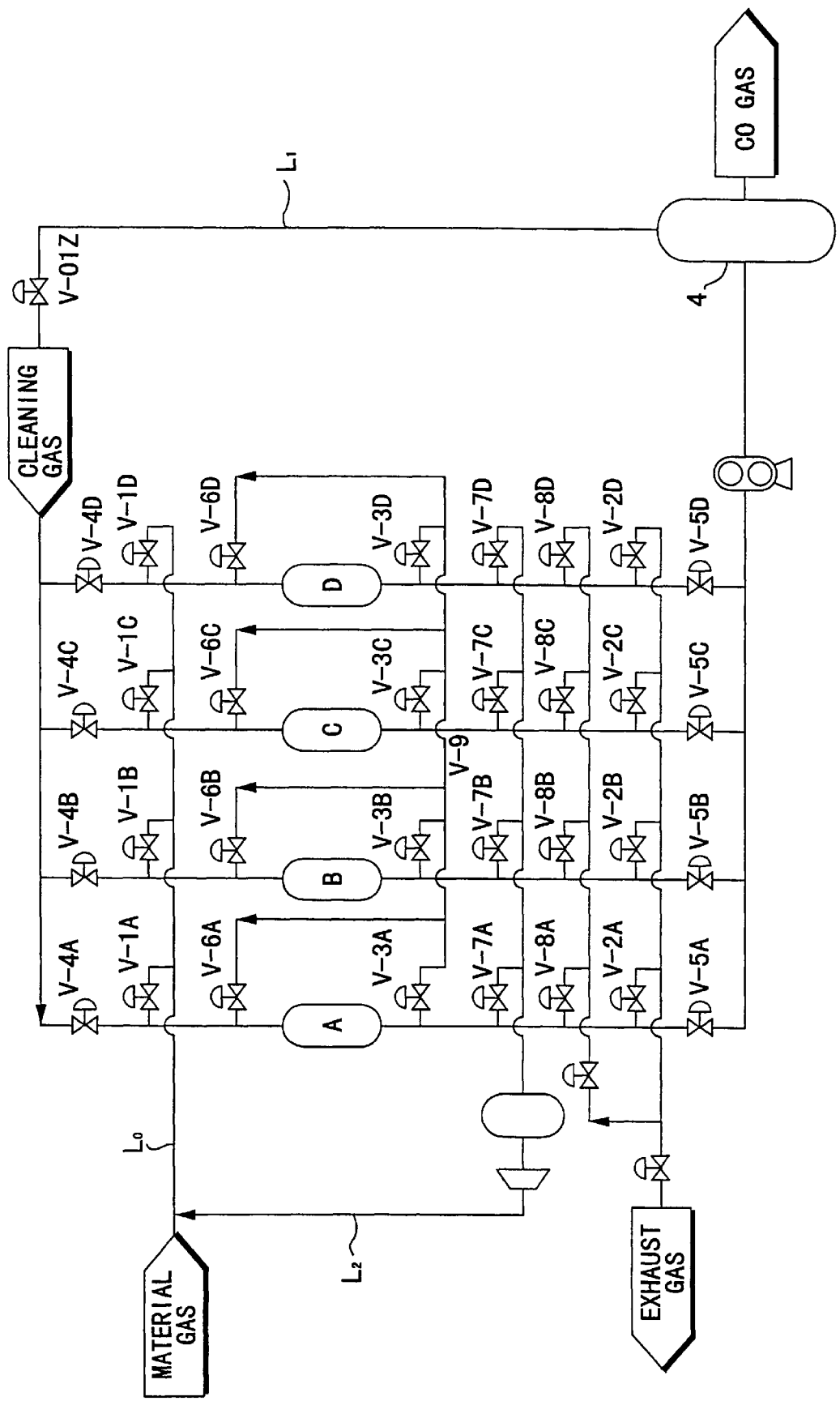
FIG. 1 is a schematic diagram showing a production line employed for a conventional PSA method.
Figure 2:
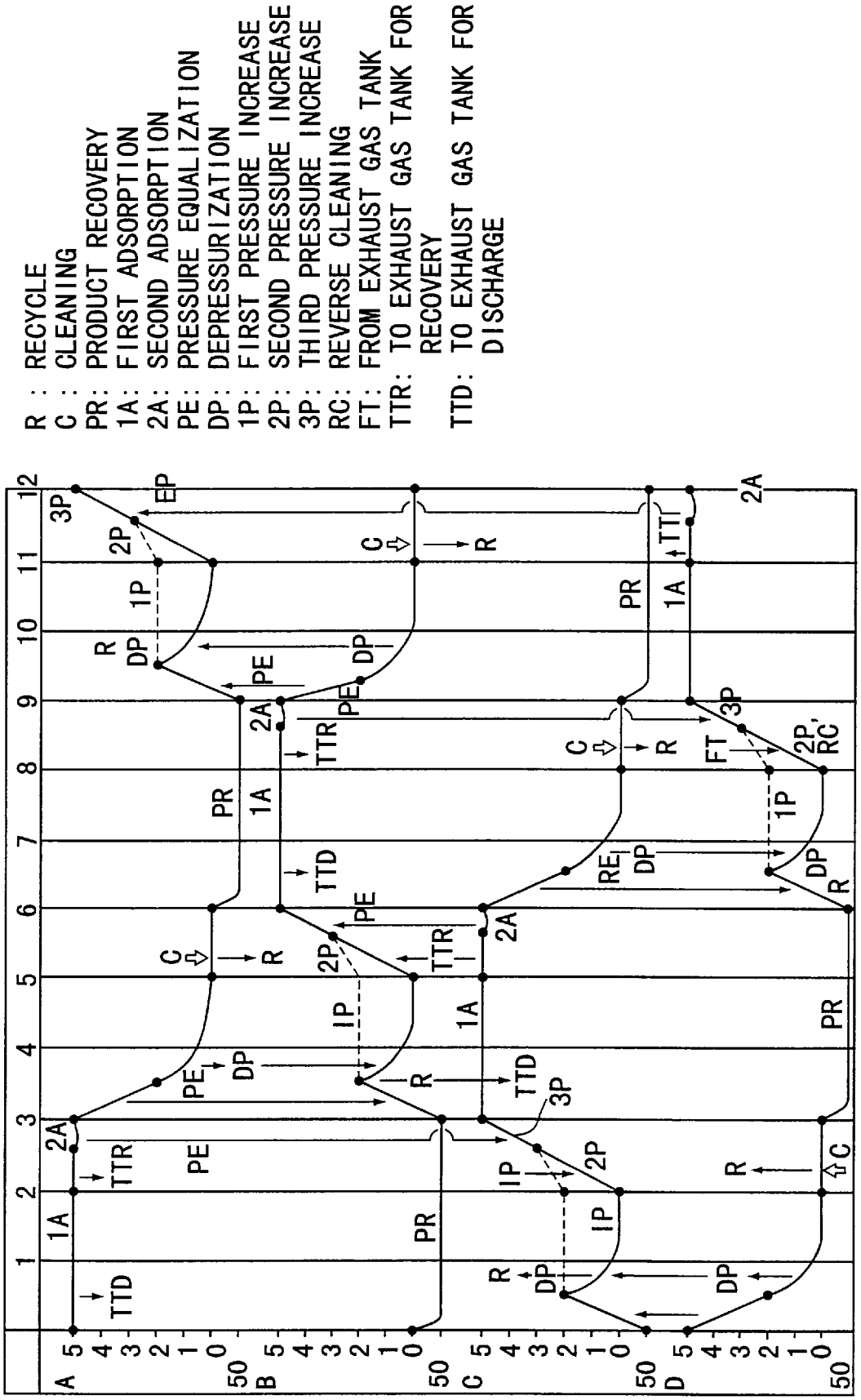
FIG. 2 is a schematic diagram showing an operation flow of four adsorption columns (A to D)

Using the conventional PSA production line shown in FIG. 1, a carbon monoxide gas having a purity of 99% was collected using a methanol cracked gas (H$_2$:67%, CO: 32%, CO$_2$:0.2%, CH$_4$:0.2%) under an adsorption pressure of 5 kg/cm$^2$G. An amount of carbon monoxide gas desorbed was 750 Nm$^3$/h. It was necessary to return 38% of the carbon monoxide gas desorbed to the adsorption column as a cleaning gas.

Next, a carbon monoxide gas having a purity of 99% was collected under the same conditions as above except that the inventive PSA production line shown in FIG. 4 was used. The states (○: open, no symbol: closed) of the valves during a continuous operation are shown in TABLE-1. In TABLE-1, Steps 3, 9, 15, 21 include the preparatory cleaning step (for example, Step 3 is the preparatory cleaning steps of the adsorption column D), and Steps 4, 10, 16, 20 are the substantial cleaning steps (for example, Step 4 is the substantial cleaning step of the adsorption column D).

TABLE 1

| STEP NO. | 1 | 2 | 3 | 4 | 5 | 6 | 7 | 8 | 9 | 10 | 11 | 12 |
|---|---|---|---|---|---|---|---|---|---|---|---|---|
| SEC. | 20 | 20 | 35 | 20 | 35 | 50 | 20 | 20 | 35 | 20 | 35 | 50 |
| V-01A | ○ | ○ | ○ | ○ | ○ | ○ | | | | | | |
| 2A | ○ | ○ | ○ | ○ | ○ | | | | | | | |
| 3A | | | | | | ○ | ○ | | | | | |
| 4A | | | | | | | | | | ○ | ○ | ○ |
| 5A | | | | | | | | | | | | |
| 6A | | | | | | | | | | | | |
| 7A | | | | | | | | | ○ | ○ | ○ | ○ |
| 8A | | | | | | | | | | | | |
| V-01B | | | | | | | | | | | | |
| 2B | | | | | | | | | | | ○ | ○ |
| 3B | | | | | | | | | | | | ○ |
| 4B | | | | | | | | | | | | |
| 5B | ○ | ○ | ○ | ○ | ○ | ○ | | | | | | |
| 6B | | | | | | | ○ | | | | | |
| 7B | | | | | | | | | | | | |
| 8B | | | | | | | | ○ | ○ | | | |
| V-01C | | | | | | | ○ | ○ | ○ | ○ | ○ | ○ |
| 2C | | | | | | ○ | ○ | ○ | ○ | ○ | ○ | ○ |
| 3C | | | | | | | ○ | | | | | ○ |
| 4C | | | | | | | | | | | | |
| 5C | | | | | | | | | | | | |
| 6C | ○ | | | | | | | | | | | |
| 7C | | | | | | | | | | | | |
| 8C | | | ○ | ○ | | | | | | | | |
| V-01D | | | | | | | | | | | | |
| 2D | | | | | | | | | | | | |
| 3D | ○ | | | | | | | | | | | |
| 4D | | | | ○ | ○ | ○ | | | | | | |
| 5D | | | | | | | | ○ | ○ | ○ | ○ | ○ |
| 6D | | | | | | | | | | | | |
| 7D | | | ○ | ○ | ○ | ○ | | | | | | |
| 8D | | | | | | | | | | | | |
| V-09 | | | ○ | ○ | ○ | | | | ○ | ○ | ○ | |
| V-10 | | | | | ○ | | | | | | ○ | |
| V-11 | | | | ○ | | | | | | ○ | | |
| V-01Z | | | | | ○ | ○ | | | | | ○ | ○ |

| STEP NO. | 13 | 14 | 15 | 16 | 17 | 18 | 19 | 20 | 21 | 22 | 23 | 24 |
|---|---|---|---|---|---|---|---|---|---|---|---|---|
| SEC. | 20 | 20 | 35 | 20 | 35 | 50 | 20 | 20 | 35 | 20 | 35 | 50 |
| V-01A | | | | | | | | | | | ○ | ○ |
| 2A | | | | | | | | | | | | ○ |
| 3A | | | | | | | | | | | | |
| 4A | | | | | | | | | | | | |
| 5A | ○ | ○ | ○ | ○ | ○ | ○ | | | | | | |
| 6A | | | | | | | ○ | | | | | |
| 7A | | | | | | | | | | | | |
| 8A | | | | | | | | | ○ | ○ | | |
| V-01B | ○ | ○ | ○ | ○ | ○ | ○ | | | | | | |
| 2B | ○ | ○ | ○ | ○ | ○ | | | | | | | |
| 3B | | | | | | ○ | ○ | | | | | |
| 4B | | | | | | | | | | ○ | ○ | ○ |
| 5B | | | | | | | | | | | | |
| 6B | | | | | | | | | | | | |
| 7B | | | | | | | | | ○ | ○ | ○ | ○ |
| 8B | | | | | | | | | | | | |
| V-01C | | | | | | | | | | | | |
| 2C | | | | | | | | | | | | |
| 3C | ○ | | | | | | | | | | | |

TABLE 1-continued

| | | | | | | | | | | |
|---|---|---|---|---|---|---|---|---|---|---|
| 4C | | | ○ | ○ | ○ | | | | | |
| 5C | | | | | | ○ | ○ | ○ | ○ | ○ |
| 6C | | | | | | | | | | |
| 7C | | | ○ | ○ | ○ | ○ | | | | |
| 8C | | | | | | | | | | |
| V-01D | | | | | | ○ | ○ | ○ | ○ | ○ |
| 2D | | | | ○ | ○ | ○ | ○ | ○ | ○ | |
| 3D | | | | | ○ | | | | | ○ |
| 4D | | | | | | | | | | |
| 5D | | | | | | | | | | |
| 6D | ○ | | | | | | | | | |
| 7D | | | | | | | | | | |
| 8D | | ○ | ○ | | | | | | | |
| V-09 | | ○ | ○ | ○ | | | ○ | ○ | ○ | |
| V-10 | | | | | ○ | | | | | ○ |
| V-11 | | | ○ | | | | | ○ | | |
| V-01Z | | | ○ | ○ | | | | ○ | ○ | |

As a result, the carbon monoxide gas returned to the adsorption column as the cleaning gas could be reduced to 25%, and the amount of carbon monoxide gas desorbed was the same level of 750 Nm³/h. Thus, about one third [(38%−25%)/38%] of the carbon monoxide gas returned to the adsorption gas as the cleaning gas thus far could be directly collected as a gas product, with the result that the production efficiency could be considerably increased. Accordingly, in the case that the desired production amount is about the same level as conventionally desired, an amount of the charged adsorbent can be reduced, which results in a smaller size of the apparatus implementing the PSA method.

Example 2

Next, an attempt was made to collect a carbon monoxide gas having a purity of 99% in accordance with the conventional PSA production line shown in FIG. 1 using a reformed gas having a carbon monoxide concentration of about 11% as a material gas. Since the carbon monoxide concentration is low, the adsorption pressure needs to be increased to 16 kg/cm²G. As a result, components other than carbon monoxide (e.g. $CO_2$, $CH_4$, $N_2$, $H_2$) were adsorbed in larger quantities and the carbon monoxide gas having a purity of 99% could not be collected if about the same amount of the cleaning gas as in the Example 1 was used. Therefore, about 60% of the carbon monoxide gas desorbed needed to be used as the cleaning gas.

Contrary to this, as a result of using the exhaust gas obtained in the substantial cleaning step as the cleaning gas used in the preparatory cleaning step in the inventive PSA production line of FIG. 4, it was sufficient to use about 40% of the desorbed carbon monoxide gas. This resulted in a remarkably increased production efficiency.

As described above, according to the inventive PSA method, a specified amount of the collected carbon monoxide gas product can be ensured without resulting in an increase in the amount of the adsorbent to be used even if the material has a low carbon monoxide concentration is used.

About one third of the carbon monoxide gas returned to the adsorption column as the cleaning gas can be directly collected as a product, thereby remarkably increasing the production efficiency. Therefore, in the case that the desired production amount is about the same level as conventionally desired, an amount of the charged adsorbent can be reduced, which results in a smaller size of the apparatus implementing the PSA method.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A gas refining method, comprising the steps of:

an absorption step comprising increasing a gas pressure of a gas containing a product gas supplied to an absorption column;

a product gas collecting step performed subsequent to the absorption step, comprising decreasing a gas pressure of the gas containing the product gas supplied to the absorption column; and a cleaning step performed between said absorption step and said product gas collecting step, said cleaning step comprising a preparatory cleaning step followed by a substantial cleaning step, wherein said preparatory cleaning step comprises supplying to the absorption column an exhaust gas from an already performed substantial cleaning step.

2. The method of claim 1, wherein said substantial cleaning step comprises supplying to the absorption column the product gas from an already performed product gas collecting step.

3. The method of claim 1, wherein the product gas is carbon monoxide.

* * * * *